United States Patent [19]

Hong

[11] Patent Number: 5,730,380

[45] Date of Patent: Mar. 24, 1998

[54] REEL TABLE TRANSFERRING MECHANISM FOR MAGNETIC RECORDING/REPRODUCING APPARATUS

[75] Inventor: Min-pyo Hong, Seoul, Rep. of Korea

[73] Assignee: Samsung Electronics Co., Ltd., Kyungki-Do, Rep. of Korea

[21] Appl. No.: 649,491

[22] Filed: May 17, 1996

[30] Foreign Application Priority Data

May 18, 1995 [KR] Rep. of Korea .................. 95-12460

[51] Int. Cl.$^6$ ............................................. G11B 15/00
[52] U.S. Cl. ............................................. 242/342; 242/336
[58] Field of Search ............................. 242/336, 342, 242/352, 352.1; 360/94

[56] References Cited

U.S. PATENT DOCUMENTS

| 4,729,046 | 3/1988 | Steipe et al. ........................ 360/94 |
| 5,082,195 | 1/1992 | Saito et al. ........................ 360/94 |
| 5,314,141 | 5/1994 | Ishii et al. ........................ 242/342 |

Primary Examiner—John P. Darling
Attorney, Agent, or Firm—Sughrue, Mion, Zinn, Macpeak & Seas, PLLC

[57] ABSTRACT

A reel table transferring mechanism including an adjusting device which enables tape cassettes of different sizes to be selectively loaded into the mechanism. The adjusting device includes guide rods for supporting two reel tables and a slide member for slidably moving the two reel tables to change the distance between the two reel tables.

10 Claims, 5 Drawing Sheets

REEL TABLE TRANSFERRING MECHANISM FOR MAGNETIC RECORDING/REPRODUCING APPARATUS

BACKGROUND OF THE INVENTION

The present invention relates to a reel table transferring mechanism for a magnetic recording/reproducing apparatus such as VTR's, camcorders or digital-video cassette recorders (D-VCR), and more particularly, to a reel table transferring mechanism for a magnetic recording/reproducing apparatus having a structure in which cassettes having different sizes can be selectively loaded.

A mechanism has recently been suggested in *Japan Television Associates* Vol. 44, No. 9, p. 1216, in which a pair of reel tables move for selectively loading one of two tape cassettes of different sizes. As shown in FIG. 3, reel tables 21 and 22 are supported by and slidable along respective pairs of guide shafts 23, 23' and 24, 24'. Timing belts 25 and 26, driven by a motor 17, enable the reel tables 21 and 22 to move, varying the distance therebetween to enable loading of tape cassettes of different sizes.

In the above-described mechanism in which the reel tables 21 and 22 move linearly, installing the required guide shaft pairs 23, 23' and 24, 24' takes up space on the deck and complicates the apparatus.

SUMMARY OF THE INVENTION

To solve the above problems, it is an object of the present invention to provide a reel table transferring mechanism for a magnetic recording/reproducing apparatus in which a smoother transfer of the reel table can be achieved. The reel table recording/reproducing apparatus according to the present invention has a simple and compact structure which results in reduced manufacturing costs.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figure 4:
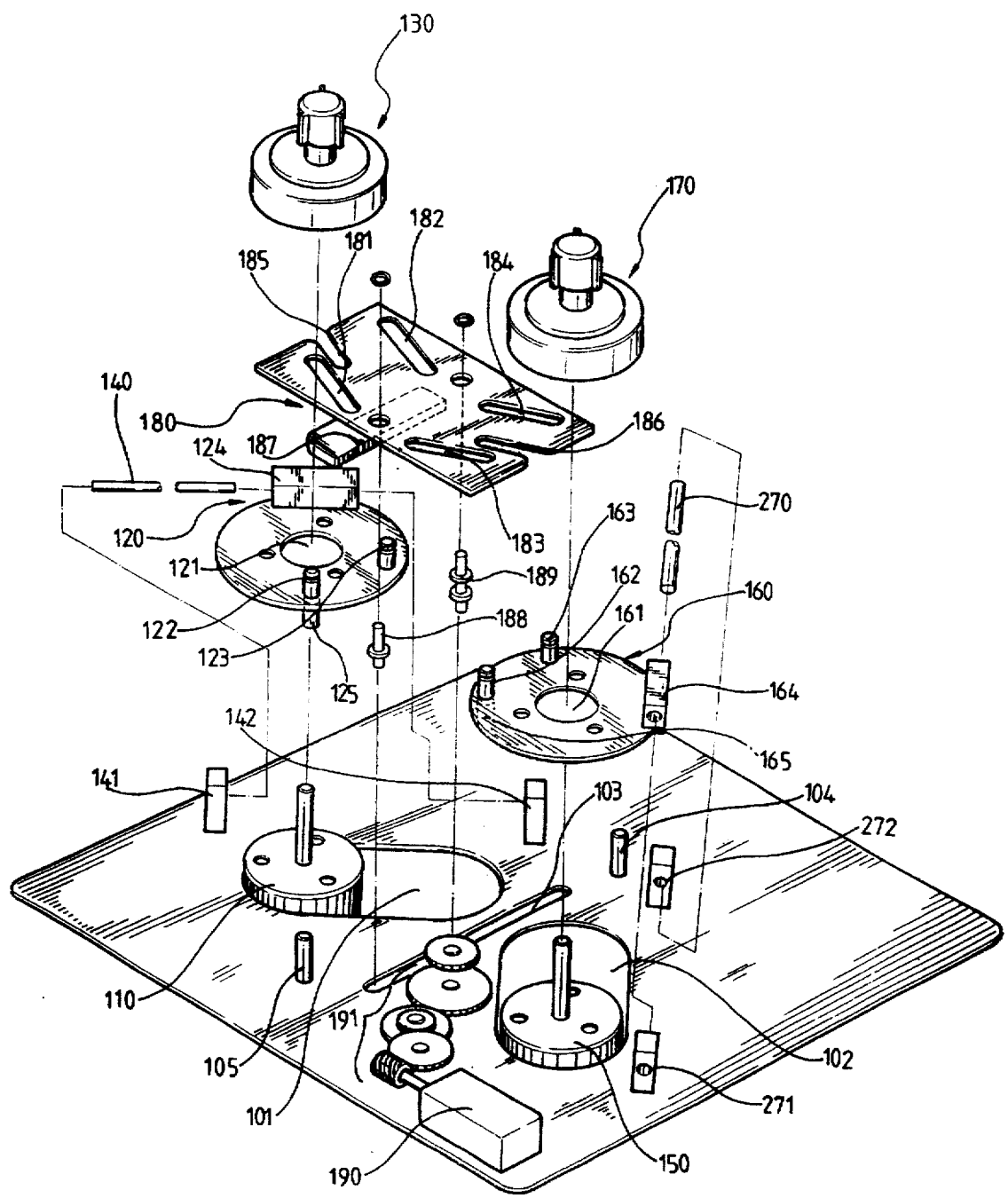
FIG. 4 is an exploded perspective view illustrating a reel table transferring mechanism according to the present invention.

Referring to FIG. 4, a characteristic feature of the present invention, in which an adjusting means adjusts the distance between the reel tables 130 and 170 for selectively loading one of tape cassettes 300 and 400 shown in FIGS. 1 and 2, will now be described.

The reel tables 130 and 170 are coupled to shafts of reel motors 110 and 150, respectively. Plate members 120 and 160 are fixed to the reel motors 110 and 150, respectively. Holes 121 and 161, through which the shafts of the respective reel motors 110 and 150 pass, are formed on the plate members 120 and 160, respectively. A guide means for guiding the reel tables 130 and 170 so that the reel tables 130 and 170 can be transferred toward and away from each other are also provided. A slide member 180 is provided between the two reel tables 130 and 170. The slide member 180, supported by a predetermined supporting means, is installed to slide on a deck 100. Also, the slide member 180 is coupled to the plate members 120 and 160 so that guide pins 122, 123, 162 and 163 of plate members 120 and 160 slide along guide slots 181, 182, 183 and 184 of the slide member 180. The guide slots 181, 182, 183 and 184 are slanted at a predetermined angle. Coupling slits 185 and 186 are formed at the sides of the slide member 180 for allowing the shafts of the reel motors 110 and 150 to slide therein. A driving means is also provided for moving the slide member 180 along a guide slit 103 of the deck 100 between the two reel tables 130 and 170. The slide member 180 is coupled with the guide slit 103 by guide supports 188 and 189 such that the slide member is able to slide along the guide slit 103. A predetermined clearance separates the slide member 180 from the deck 100, as shown in FIG. 7.

First and second guide holes 101 and 102 are formed on the deck 100 to facilitate the movement of the reel tables 130 and 170. As shown in FIG. 7, the reel motors 110 and 150, for driving the reel tables 130 and 170, respectively, are disposed so that the reel motors 110 and 150 slide partly below the deck 100. Accordingly, the deck mechanism is compact.

The guide means includes guide rods 140 and 270 arranged exterior to and along the sides of the first and second guide holes 101 and 102. These guide rods 140 and 270 are supported by a plurality of supports 141, 142, 271 and 272 which are fixed on the deck 100. The plate members 120 and 160 are slidably coupled with the guide rods 140 and 270 by means of pipe-shaped guide blocks 124 and 164, fixed to one side of the plate members 120 and 160, respectively, through which the guide rods 140 and 270 are inserted.

Figure 7:
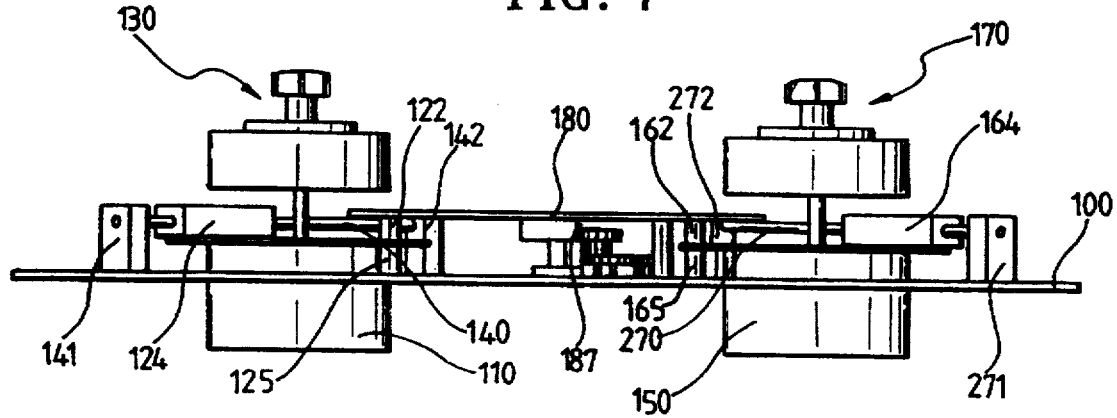
FIG. 7 is a side view schematically illustrating the reel table transferring mechanism according to the present invention.

Supports 125 and 165 are formed at the other side of the plate members 120 and 160, as shown in FIGS. 4 and 7, which contact the deck 100. Thus, the plate members 120 and 160 are stably supported while maintaining a horizontal state by means of the guide rods 140 and 270 and the supports 125 and 165.

Figure 5:
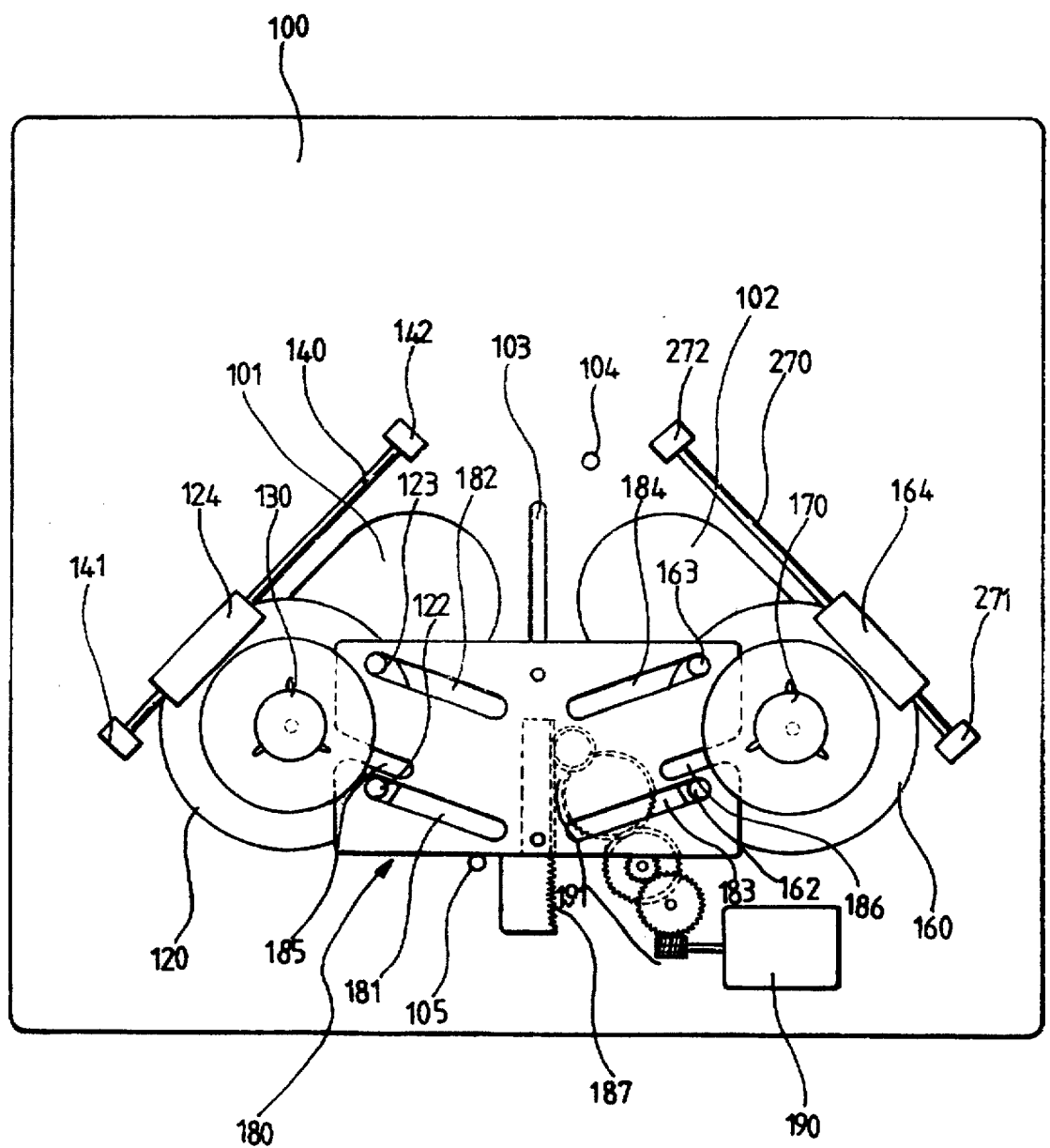
FIGS. 5 and 6 are plan views illustrating the operating positions of the reel table, respectively.
Figure 6:
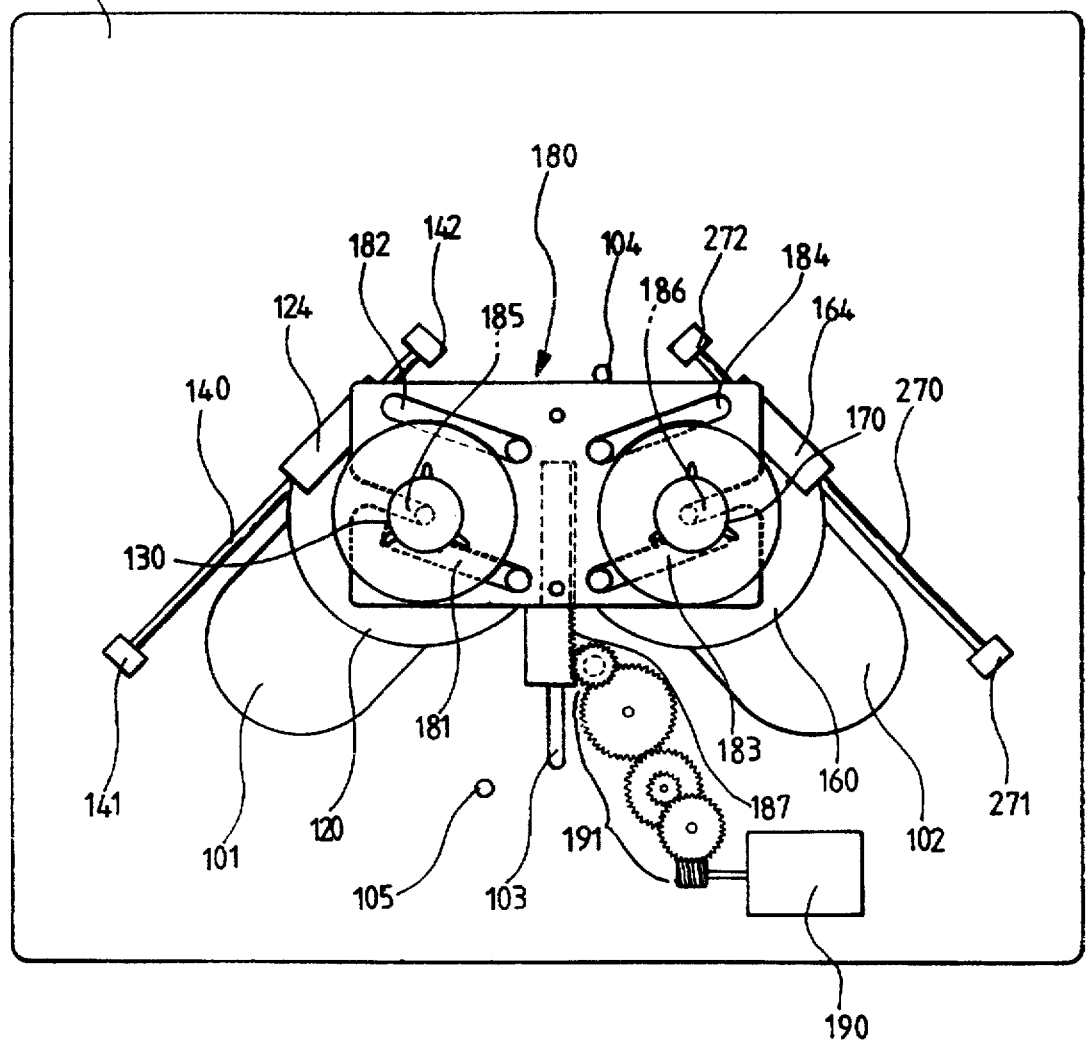

The driving means for moving the slide member 180 has the following structure as shown in FIGS. 4 through 6. A rack member 187, where a rack gear is formed, is attached to the bottom of the slide member 180. The last gear of a gear train 191, installed on the deck 100, engages with the rack member 187, wherein the gear train 191 is driven by a driving motor 190, thus enabling the slide member 180 to slide by the driving force of the driving motor 190.

As shown in FIGS. 5 and 6, a position determining means is provided for determining the operating positions of the reel tables 130 and 170. The position determining means includes first and second stoppers 104 and 105 which are formed on the deck 100 at predetermined positions to limit the movement of the slide member 180.

The reel table transferring mechanism according to the present invention operates as follows.

Figure 1:
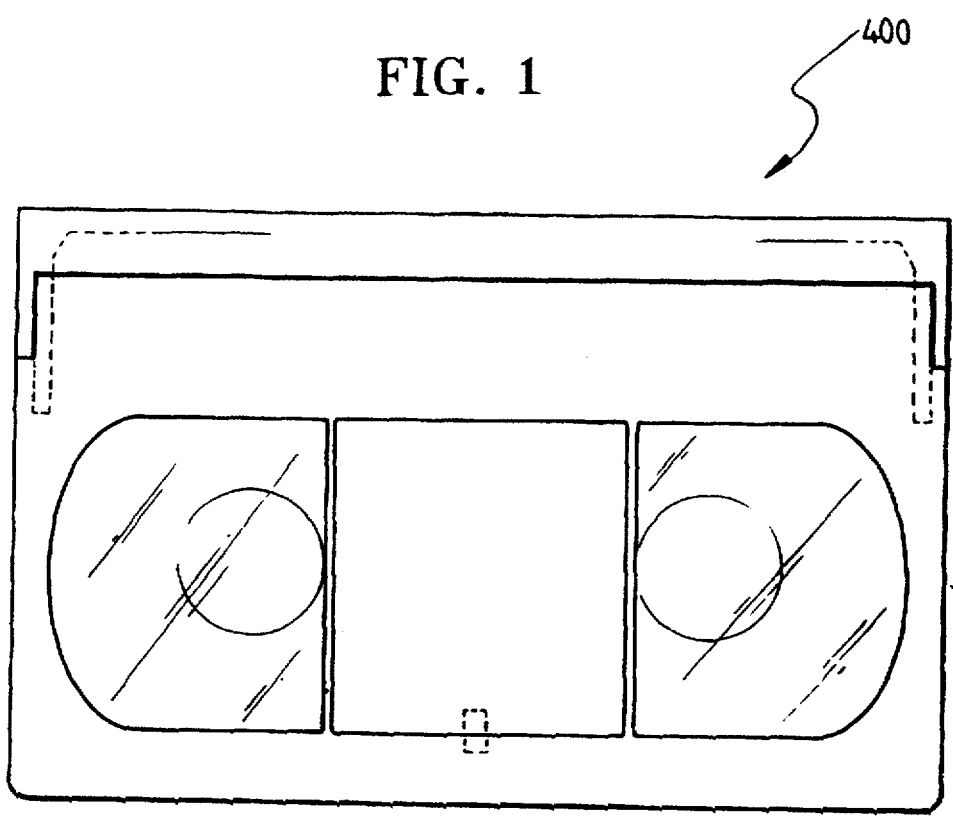
FIGS. 1 and 2 are plan views illustrating a large tape cassette and a small tape cassette, respectively.

FIG. 5 shows the reel tables 130 and 170 in a position to receive the tape cassette 400 of FIG. 1. First, the last gear of the gear train 191, engaged with the rack member 187, rotates counter-clockwise by the driving force of the driving motor 190. The slide member 180 slides until it contacts the stopper 105 as shown in FIG. 5. The plurality of guide pins 122, 123, 162 and 163 slide along the guide slots 181, 182, 183 and 184, and simultaneously, the plate members 120 and 160 move along the guide rods 140 and 270, respectively. While moving, the plate members 120 and 160 remain horizontal with the assistance of the supports 125 and 165 contacting the deck 100.

When the slide member 180 moves down to contact the stopper 105, the shafts of the reel motors 110 and 150 leave the coupling slits 185 and 186. Consequently, as the slide member 180 moves downward, the distance between the reel tables 130 and 170 becomes wider. Thus, the tape cassette 400 of FIG. 1 can be placed on the reel tables 130 and 170.

Figure 2:
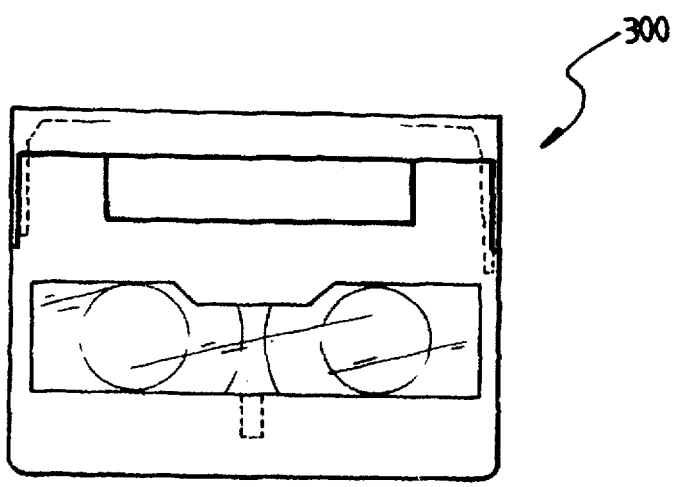
Figure 3:
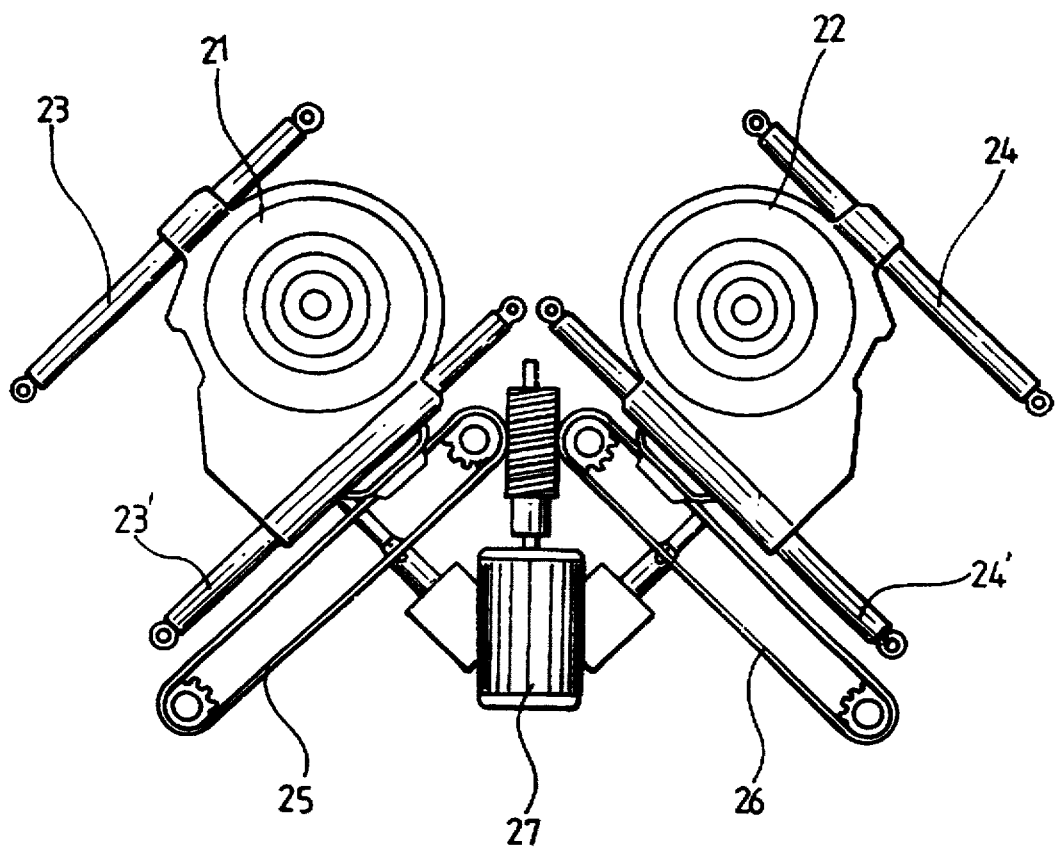
FIG. 3 is a plan view schematically illustrating a conventional reel table transferring mechanism.

FIG. 6 shows the reel tables 130 and 170 in a position for receiving the smaller tape cassette 300 of FIG. 2. First, the last gear of the gear train 191, which is engaged with the rack member 187, is rotated clockwise by the driving force of the driving motor 190. The slide member 180 moves up as shown in FIG. 6. The plurality of guide pins 122, 123, 162 and 163 slide along the guide slots 181, 182, 183 and 184 of the slide member 180. At the same time, the plate members 120 and 160 are transferred along the guide rods 140 and 270, respectively. While moving, the plate members 120 and 160 remain horizontal with the assistance of the supports 125 and 165.

When the slide member 180 moves upward, the shafts of the reel motors 110 and 150 are slidingly coupled with the coupling slits 185 and 186. Accordingly, as the slide member 180 moves up, the distance between the reel tables 130 and 170 becomes narrower. Thus, the tape cassette 300 of FIG. 2 can be placed on the reel tables 130 and 170. Also, excessive movement of the slide member 180 is prevented by the first stopper 104. Consequently, the tape cassette 300 can be loaded.

As described above, the reel table transferring mechanism according to the present invention has a structure enabling the two reel tables 130 and 170 to be transferred by the movement of one slide member 180, unlike the conventional technology. Therefore, the mechanism is simpler and manufacturing cost is reduced due to a fewer number of parts.

What is claimed is:

1. A reel table transferring mechanism for a magnetic recording/reproducing apparatus comprising:
   a deck;
   a pair of reel tables, installed on said deck, for receiving reels of a tape cassette; and
   adjusting means for adjusting the distance between said reel tables to enable said reel tables to receive tape cassettes of different sizes which are selectively placed on said reel tables, wherein said adjusting means comprises:
     a pair of plate members which respectively support reel motors for driving said reel tables;
     guiding means for guiding movement of said reel tables to adjust the distance between said reel tables;
     a slide member disposed between said reel tables and slidably coupled to said deck and to said plate members;
     support means for supporting said slide member;
     coupling means for coupling said plate members to said slide member; and
     driving means for driving movement of said slide member.

2. The reel table transferring mechanism as claimed in claim 1, wherein said guiding means comprises a pair of supports, for each of said plate members, which are fixedly installed at predetermined positions on said deck along a sliding direction of said reel tables, said pair of supports being coupled to one side of said plate members by respective guide rods to facilitate sliding.

3. The reel table transferring mechanism as claimed in claim 2, further comprising supports on a predetermined side of said plate members, respectively, and contacting said deck; said pair of supports together with an associated guide rod provide support for corresponding ones of said reel tables.

4. The reel table transferring mechanism as claimed in claim 1, wherein said coupling means comprises:
   a plurality of guide pins formed on each of said plate members; and
   a plurality of guide slots, formed on said slide member, for respectively receiving said guide pins.

5. The reel table transferring mechanism as claimed in claim 4, wherein said plurality of guide slots are formed at an angle on said slide member.

6. The reel table transferring mechanism as claimed in claim 1, wherein said driving means comprises:
   a rack member coupled to a bottom surface of said slide member; and
   a driving motor coupled with said rack member.

7. The reel table transferring mechanism as claimed in claim 1, further comprising position determining means for determining a transfer position of said reel tables.

8. The reel table transferring mechanism as claimed in claim 7, wherein said position determining means includes first and second stoppers formed at predetermined positions on said deck to limit the movement of said slide member.

9. The reel table transferring mechanism as claimed in claim 1, further comprising:
   said pair of reel motors respectively corresponding to each of said reel tables; and
   first and second guide holes, formed at positions on said deck corresponding to movement of said reel tables, respectively, wherein each reel motor is disposed under said deck.

10. The reel transferring mechanism as claimed in claim 1, wherein said support means comprises:
    a guide hole formed on said deck corresponding to the movement of said slide member; and
    a plurality of guide supports coupled to said slide member and to said guide hole to allow sliding.

* * * * *